April 22, 1958  H. RIFFERT  2,831,559
LINE-SPACE WHEEL COUPLING FOR RECORDING OFFICE MACHINES
Filed Feb. 6, 1956
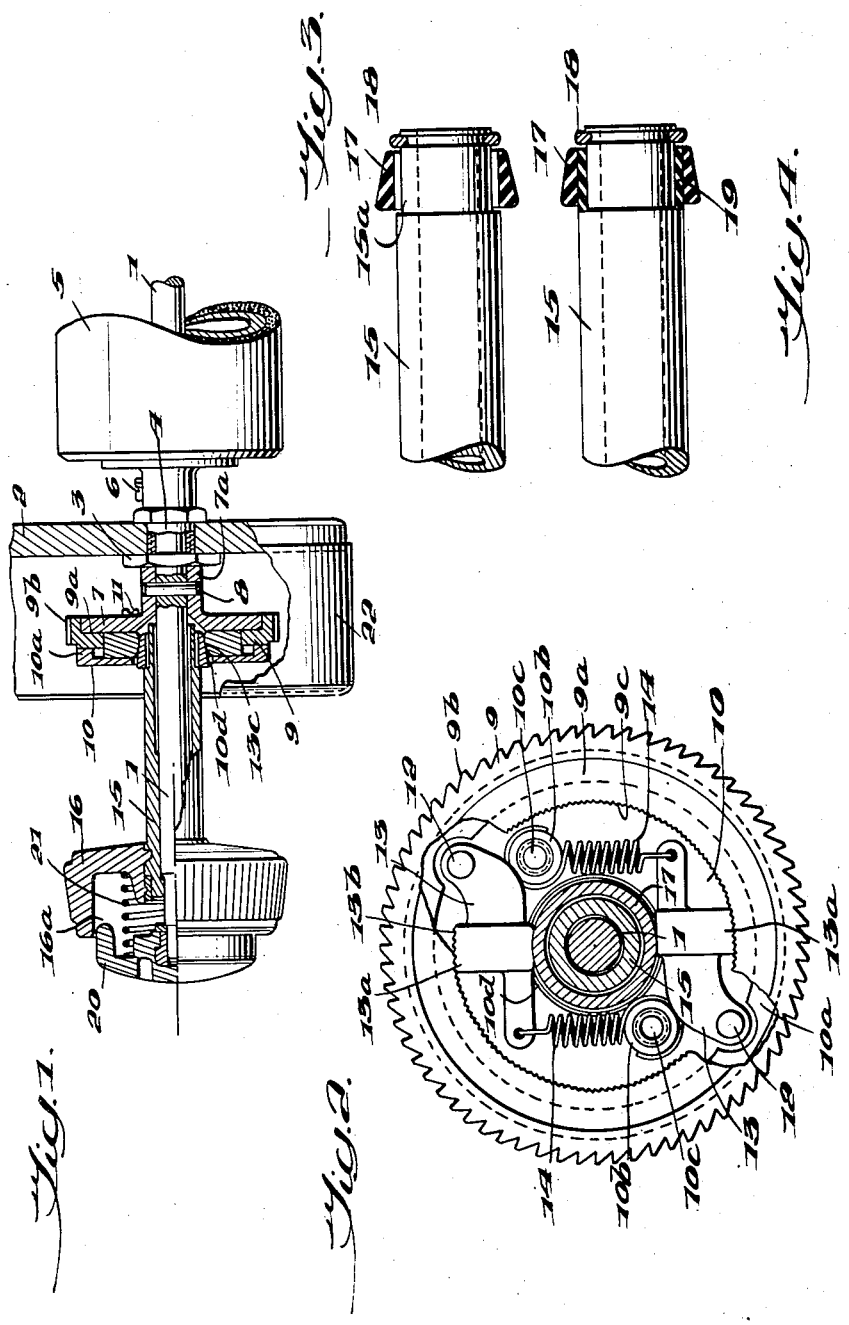

United States Patent Office 2,831,559
Patented Apr. 22, 1958

2,831,559

LINE-SPACE WHEEL COUPLING FOR RECORDING OFFICE MACHINES

Helmut Riffert, Wilhelmshaven, Germany, assignor to Olympia Werke A. G., Wilhelmshaven, Germany Application February 6, 1956, Serial No. 563,749

3 Claims. (Cl. 197—123)

This invention relates to a line-space wheel coupling for recording office machines, e. g., typewriting machines, with swingably installed jaws provided with a key-face in each case, said jaws being constructed as coupling members between line-space wheel and platen under spring action and cooperating with a cone which is arranged on a carrier slidable in axial direction of the platen, opposite to the action of a spring.

The known function of the line-space wheel couplings is to provide for an operating connection between the line-space wheel and the platen, fixed on the platen axis, by means of engaging and disengaging coupling members which object is, for example, realized in that the swingably installed jaws, provided with a toothed gearing on the outside periphery are in mesh with counter-gear teeth arranged within the line-space wheel. The disengagement, i. e., the unmeshing of the gears, is effected in known manner by shifting an adjusting rod or the like, provided with an operating knob, which adjusting rod serves as carrier for a cone rigidly mounted at an end of said rod; this cone, during the longitudinal shifting, affects the coupling jaws in such a way that they are rocked into the disengaged position.

The known cone as well as the cooperating coupling jaws are, however, during their manipulation, i. e., during engagement and disengagement, subject to an extremely heavy wear so that the cone, as a result of the lack of adjustability due to its rigid mounting, is not able during the engagement to transfer uniformly the bearing pressure on the coupling jaws, whose teeth are unilaterally applied or stressed as carrier on account of the different load. In consequence, a safe operation of the coupling is no longer secured and the slipping coupling causes undesired secondary phenomena such as line misplacement, shifting noise and an increased wear of said construction parts.

The present invention has for its object to improve considerably such a known line-space wheel coupling in that the cone is installed on the carrier in such a way as to be movable in radial and axial directions.

The detailed construction shows a cone which is seated on the carrier with radial and axial clearance.

The advantage of this installation is that the cone can, at any time, be adjusted within its clearance in such a way that the bearing pressure in the engaged position is uniformly divided on both coupling jaws under elimination of a different stress. Even during irregular or unilateral wear of the coupling jaws or of the cone, a perfect operation of the coupling is secured due to the feasibility of the automatic adjustment of the cone, and eventual production tolerances are simultaneously adjusted. For these reasons, the production of such a coupling device appears economically more favorable since the additional expensive treatment of the necessary particular parts, such as, e. g., the coupling jaws and the cone, can be eliminated. Likewise, the mounting work during the assemblage of the total device is very simple since the cone is not pressed, as hitherto, but only attached and secured with the help of a spring ring.

To avoid supplementary shifting noise, it is, in particular, advantageous to provide between cone and carrier an insert of elastic material, such as rubber or the like, wherewith the autonomous adjusting possibilities of the cone in both axial and radial directions are entirely retained.

The drawing represents a constructive example of the line-space wheel device according to the present invention, in which:

Fig. 1 shows the side-view of the line-space wheel coupling, partly in sectional representation, arranged on the left side of the paper carriage;

Fig. 2 shows a radial section of the coupling at the level of the line-space wheel;

Fig. 3 shows one form of installation of the cone on the carrier; and

Fig. 4 shows a modified form of cone installation.

On a shaft 1, which in known way is pivoted in the side wall 2 of the paper carriage of the machine (not represented in detail), by means of a bushing-like screw 4 secured by a screw-nut 3, there is arranged the platen 5 secured in its position by a set screw 6. On the shaft 1 there is further provided a disk 7 having a hub 7a portion which is rigidly connected with the shaft 1 by means of a fitting pin 8 led through the hub. On the front side of the disk 7 there is pivoted the line-space wheel 9, which wheel is provided with a recess 9a of such form that the line space wheel 9 constantly receives the disk 7 in said recess. The line-space wheel 9 carries on its periphery a ratchet-toothed cogging 9b, cooperating in known way with the line-space lever (which is not represented in detail) of the machine. For securing the position of the line space wheel 9 on the disk 7, there is installed a plate 10 provided with a rim 10a which is laid against the periphery of the line-space wheel 9. The plate 10 is fastened on the disk 7 by means of two spacing screws 11, of which, however, only one screw is represented in Fig. 1. Said screws engage two projecting parts 10b, arranged on the plate 10, and are provided with threaded openings 10c (Fig. 2). In the center of the plate 10 there is provided a bore-hole 10d.

The rim 10a of the plate 10 is hollowed out at two opposed spots for the reception of two bolts 12, which serve as axes of rotation for two swingingly disposed jaws 13. Each of these jaws 13 is extended at its middle part with a block 13a provided on its front face with a gear teeth system 13b which cooperates with an internal gear teeth system 9c disposed inside of the line space wheel 9. The end of each block 13a directed towards the shaft 1 is constructed as spherical key face 13c. At the free end of each jaw 13 there is suspended a screw thrust spring 14 which is, at its other end, fastened on one of the projecting parts 10b.

At the end of the shaft 1, represented in Fig. 1, there is suspended an axially movable sleeve 15, with an operating handle 16, rigidly fastened at its outside end, and which is provided at its other end with a shoulder 15a of smaller diameter, led through the bore-hole 10d of the plate 10. As illustrated in Fig. 3 of the drawing, there is yieldably secured on said shoulder 15a a cone 17 which is in operating communication with the jaws 13 over the key face 13c, and whose boring diameter is larger than the diameter of the shoulder 15a of the sleeve 15, so that the cone 17 can radially be moved for the magnitude of the difference of both diameters. A spring ring 18, disposed at the end of the shoulder 15a, secures the cone 17 against dislodgement, wherewith the spring ring 18 is installed so that a clearance is also left to the cone 17 in axial direction.

Fig. 4 shows another construction form of the installation of the cone 17, wherein the clearance between the shoulder 15a of the sleeve 15 and the cone 17 is filled with an elastic insert 19 of rubber or a similarly acting material. In this way it is attained that the cone cannot be moved automatically but is able to assume the respective positions under stress in the same way as explained above.

A knob 20 is screwed at the outer end of the shaft 1 which knob is dimensioned so as to fit into a recess 16a of an operating handle 16 secured to sleeve 15. A spiral pressure spring 21 under initial stress is disposed between the knob 20 and the operating handle 16. A cover cap 22 is placed on the side wall 2 which serves for the protection of the coupling mechanism against entry of dust or the like.

The mode of operation of the line-space wheel coupling is as follows: In the resting position, the pressure spring 21, supported on the knob 20, pushes the sleeve 15, by means of the operating handle 16 fixed thereon, in the direction of the platen 5, so that the jaws 13 are maintained in gearing position with the line space wheel 9 against the action of the spring 14, by the cone 17, arranged at the end of the sleeve 15 with clearance or with the elastic insert, and both cooperating gear teeth systems 13b of the jaws 13 or 9c of the line-space wheel 9 are in reciprocal engagement. The length of the sleeve 15 is so dimensioned that, in this position, the end of the shoulder 15a is disposed immediately in front of the disk 7 without contacting it so that the full compressive stress of the spring 21 can be transferred to the jaws 13 over the cone 17. Since the cone 17 is mobile in axial and radial directions within its clearance or through the elasticity of the insert 19, the cone can, even under variable dimensions, e. g., of the jaws 13, always be set in such a way that a uniform contact pressing of both jaws 13 against the line space wheel 9 is, in any case, effected with practically equal pressure distribution.

To shift the platen 5 independently on the line space wheel 9, the sleeve 15 with the cone 17 is first drawn away from the line space wheel 9, against the action of the spring 21, by manipulating the handle 16, and thus the cone 17 is also withdrawn from the jaws 13. Then the springs 14 are able to move the jaws 13 out of engagement with the line space wheel 9, whereby the coupling is disengaged and the platen 5 could freely rotate when the handle 16 is held in the retracted position.

The re-engagement is effected by loosening the handle 16, whereby all coupling parts can, through the pressure spring 21, be returned into the first-described position.

I claim:

1. A recording office machine comprising a platen, ratchet mechanism for operating said platen, a clutch for engaging and disengaging said platen with said ratchet mechanism, a spring member, a carrier member slidable in the axial direction of said platen against the action of said spring member, and a movable cone mounted on said carrier member and slidable therewith, said cone being provided with a portion of maximum diameter for holding said clutch in engaging position and being movable in radial and axial directions on said carrier member.

2. Line-space wheel coupling as defined in claim 1, characterized in that the cone is mounted with radial and axial clearance on the carrier member.

3. Line-space wheel coupling as defined in claim 1, characterized in that an insert of elastic material is provided between cone and carrier member.

References Cited in the file of this patent

UNITED STATES PATENTS 1,456,778    Hokanson _____ May 29, 1923